Sept. 12, 1944.　　A. W. EPPERSON　　2,358,153
CENTER DRILL POINT EXTRACTOR
Filed April 13, 1942
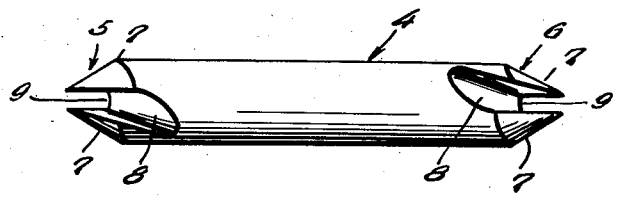
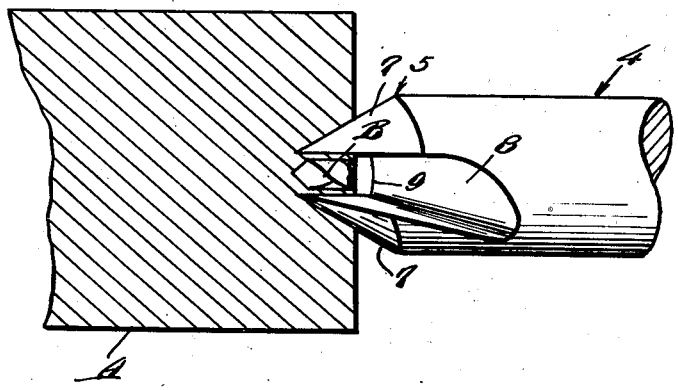
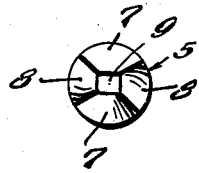
Inventor
Arthur W. Epperson
By Clarence A. O'Brien
and Harvey B. Jacobson
Attorney Patented Sept. 12, 1944

2,358,153

UNITED STATES PATENT OFFICE 2,358,153

CENTER DRILL POINT EXTRACTOR

Arthur W. Epperson, Hazel Park, Mich.

Application April 13, 1942, Serial No. 438,855

1 Claim. (Cl. 77—69)

The present invention relates to an ancillary or specially constructed drill or tool expressly devised to function as an extractor, that is, as an expedient means to dislodge from a metal shaft or the like the broken tip of a conventional center drill.

As is generally well known, one end of the steel rod or other work adapted to be fastened on the tailstock of a lathe is fashioned with a conical recess to accommodate the pointed pin on the tailstock. This conical pin-accommodating socket is cut or drilled by way of a so-called center drill, this being of the type tapered at one end having spiral cutting elements and a sort of bladed pilot extension. In the course of performing this task the tip or pilot extension of the center drill often breaks off and is left lodged in the bottom of the conically-shaped socket.

As center drills are made of high speed steel, when the tip sinks in, it is difficult to disgorge or dislodge it. So, therefore, I have discovered the need for the provision of a special implement or tool to accomplish this purpose.

In carrying into practice the present method and means of practicing it, I have found it expedient and practical to utilize a spiral twist drill having tapered ends with the apex portion of the taper notched to hood over the tip which is being fished for.

The preferred embodiment of the invention is characterized by a simple and expedient drill of a convertible or interchangeable type, that is, one comprising a body or shank with opposite ends tapered and diametrically fluted to provide cutting elements, the apices of the tapers being countersunk or notched to form clearance pockets or adapters for the tip or part to be counterdrilled for dislodgment purposes.

Other features and advantages of the invention will become more readily apparent from the following description and drawing.

In the drawing, wherein like numerals are employed to designate like parts throughout the same:

Figure 1 is an elevational view of a double-ended drill constructed in accordance with the principles of the present invention.

Figure 2 is an enlarged fragmentary elevational view showing the manner of using the unique tool.

Figure 3 is a view observing the structure from either end thereof.

Referring now to the drawing by distinguishing reference characters, attention comes first to Figure 2, wherein the part A is conveniently designated as the work or shaft in which the center drill tip B is lodged. As explained, in forming the conical recess in one end of the shaft or other "work," it is to be assumed that the tip or pilot point was broken off from the conventional center drill (not shown) and that it is now desired to fish for and dislodge the same.

This is accomplished through the use of the tool illustrated in the drawing. This tool comprises a cylindrical shank or body 4 which is uniform in diameter from end to end. It is of a convertible or reversible type, and for that reason the opposite ends or "drills" 5 and 6 are slightly different in measurements, but fundamentally the same. Each end is tapered, as at 7, and this taper corresponds to the taper of the conventional center drill. In other words, this fits snugly into the already existing conical socket in the work A. The diametrically opposite spiraling flutes are arranged and fashioned to provide cutting elements which straddle the broken drill tip B. In addition, the tapered end is formed with a central or axial notch 9, and this is of a predetermined depth so as to take over and accommodate the tip to be dislodged. In other words, this notch is in effect a clearance pocket which is of rectangular cross section, as shown in Figure 3, and which coordinates its function with the cutting elements as advantageously illustrated in Figure 2 of the drawing.

By clamping this novel salvaging tool in a chuck or the like (not shown), it may be used in succession to the ordinary center drill to accomplish the dislodgment of the broken drill tip, as is obvious. In other words, if in drilling the conical depression in the end of the work, the tip of the tool becomes broken off and lodged as shown in the drawing, then the salvaging or "fishing" tool is brought into use, this for accomplishing the stated result.

A careful consideration of the foregoing description in conjunction with the invention as illustrated in the drawing will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

A center drill tip extracting tool comprising a solid body circular in cross-section and adapted to be secured in a chuck and project forwardly therefrom, said body having its operating end tapered to form a frusto-conical end for the body, the tapered end of the body being formed with a pocket leading from its outer end axially of the body and rectangular in cross-section and open at two of its opposite sides, and said body being formed with kerfs extending longitudinally of the body from the open sides of the pocket and beyond the tapered portion of the body and gradually increasing in width towards their rear ends while gradually reducing in depth towards their rear ends and forming of the forward end portion of the body a plurality of cutters sharpened along their side edges.

ARTHUR W. EPPERSON.